(12) United States Patent
Maletsky et al.

(10) Patent No.: US 9,076,002 B2
(45) Date of Patent: Jul. 7, 2015

(54) STORED AUTHORIZATION STATUS FOR CRYPTOGRAPHIC OPERATIONS

(71) Applicant: Atmel Corporation, San Jose, CA (US)

(72) Inventors: Kerry Maletsky, Monument, CO (US); Balaji Badam, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 13/789,419

(22) Filed: Mar. 7, 2013

(65) Prior Publication Data

US 2014/0258729 A1    Sep. 11, 2014

(51) Int. Cl.
*G06F 21/60* (2013.01)
*G06F 21/64* (2013.01)
*H04L 9/08* (2006.01)

(52) U.S. Cl.
CPC .............. *G06F 21/602* (2013.01); *G06F 21/64* (2013.01); *H04L 9/08* (2013.01)

(58) Field of Classification Search
None
See application file for complete search history.

(56) References Cited

U.S. PATENT DOCUMENTS

| | | | |
|---|---|---|---|
| 2002/0131601 A1* | 9/2002 | Ninomiya et al. | 380/277 |
| 2004/0151319 A1* | 8/2004 | Proudler | 380/277 |
| 2006/0117177 A1* | 6/2006 | Buer | 713/155 |
| 2007/0050303 A1* | 3/2007 | Schroeder et al. | 705/67 |
| 2007/0094719 A1* | 4/2007 | Scarlata | 726/9 |
| 2007/0106895 A1* | 5/2007 | Huang et al. | 713/170 |
| 2008/0059799 A1* | 3/2008 | Scarlata | 713/176 |
| 2011/0035604 A1* | 2/2011 | Habraken | 713/193 |
| 2012/0173885 A1* | 7/2012 | Acar et al. | 713/193 |

* cited by examiner

*Primary Examiner* — Jung Kim
*Assistant Examiner* — Adrian Stoica
(74) *Attorney, Agent, or Firm* — Fish & Richardson P.C.

(57) ABSTRACT

A hardware authentication device is disclosed that uses a cryptographic signature verification operation to authorize a subsequent cryptographic operation to be performed using the same or different keys and stores that authorization status in protected memory. The cryptographic algorithm may be an ECDSA signature, SHA-based Message Authentication Code (MAC) or any other cryptographic algorithm. The authorization status may be stored for a number of uses for a period of time or until a certain event occurs. In some implementations, the authorization status and the key that was authorized are stored in the same protected location in memory to preserve their relation to each other and prevent modification of either of them. Depending on system policy, the authorization mechanism might be a static stored external token that authorizes key use or an authorization process that is regenerated using a random (e.g., unique) number.

20 Claims, 3 Drawing Sheets

STORED AUTHORIZATION STATUS FOR CRYPTOGRAPHIC OPERATIONS

TECHNICAL FIELD

This disclosure relates generally to cryptographic processing devices.

BACKGROUND

Computer systems (e.g., personal computers, smart phones, electronic tablets) have communication ports that are used to couple to peripheral devices (e.g., printers, headphones, charging cables). In some applications, it is desirable to authenticate peripheral devices to ensure compatibility or to protect sensitive information. Authentication can be performed using a Digital Signal Algorithm (DSA), such as Elliptic Curve DSA (ECDSA).

A DSA may be implemented in a hardware authentication device. The hardware authentication device may be an integrated circuit chip that is embedded in a computer system. The authentication device may be configured to perform various high security applications, such as anti-counterfeiting, protection for firmware or media, session key exchange, secure data storage and user password checking A DSA often performs multiple asymmetric cryptographic operations using secure data (e.g., a private key).

Key authorization is a standard cryptographic requirement in many systems and can be used to prevent fraudulent use of a key if the device containing the key is stolen or otherwise available. For instance, if a key is used as identification for a person the authorizing value could be a password known only to the person. If the device with the ID is stolen, the thief cannot use the device to sign fraudulent messages since he does not know the password. Conventional authentication devices fail to retain key authentication status in a secure manner, resulting in reduced authentication speed in sessions where subsequent cryptographic operations using the same key are performed.

SUMMARY

A hardware authentication device is disclosed that uses a cryptographic signature verification operation to authorize a subsequent cryptographic operation to be performed using the same or different keys and stores that authorization status in protected memory. The cryptographic algorithm may be an ECDSA signature, SHA-based Message Authentication Code (MAC) or any other cryptographic algorithm. The authorization status may be stored for a number of uses for a period of time or until a certain event occurs. In some implementations, the authorization status and the key that was authorized are stored in the same protected location in memory to preserve their relation to each other and prevent modification of either of them. Depending on system policy, the authorization mechanism might be a static stored token that authorizes key use or an authorization process that is regenerated using a random (e.g., unique) number.

Particular implementations disclosed herein provide one or more of the following advantages: 1) storing authorization status provides hardware authentication devices with a low cost, easily integrated method to improve system confidence and increase the total value of the solution, and enables host devices that require authentication to better achieve a desired throughput in real time; 2) storing authorization status helps increase peripheral devices (e.g., printers, smartphone accessories) to authenticate quickly; and 3) the authorization status and the corresponding key are stored together in secure memory to preserve their relation to each other and prevent modification of either of them, thus giving the authorizing entity confidence in the way that authorization has been used and providing the user with a convenient or practical way to get the protected feature or function.

DETAILED DESCRIPTION

Example Hardware Authentication Device

Figure 1:
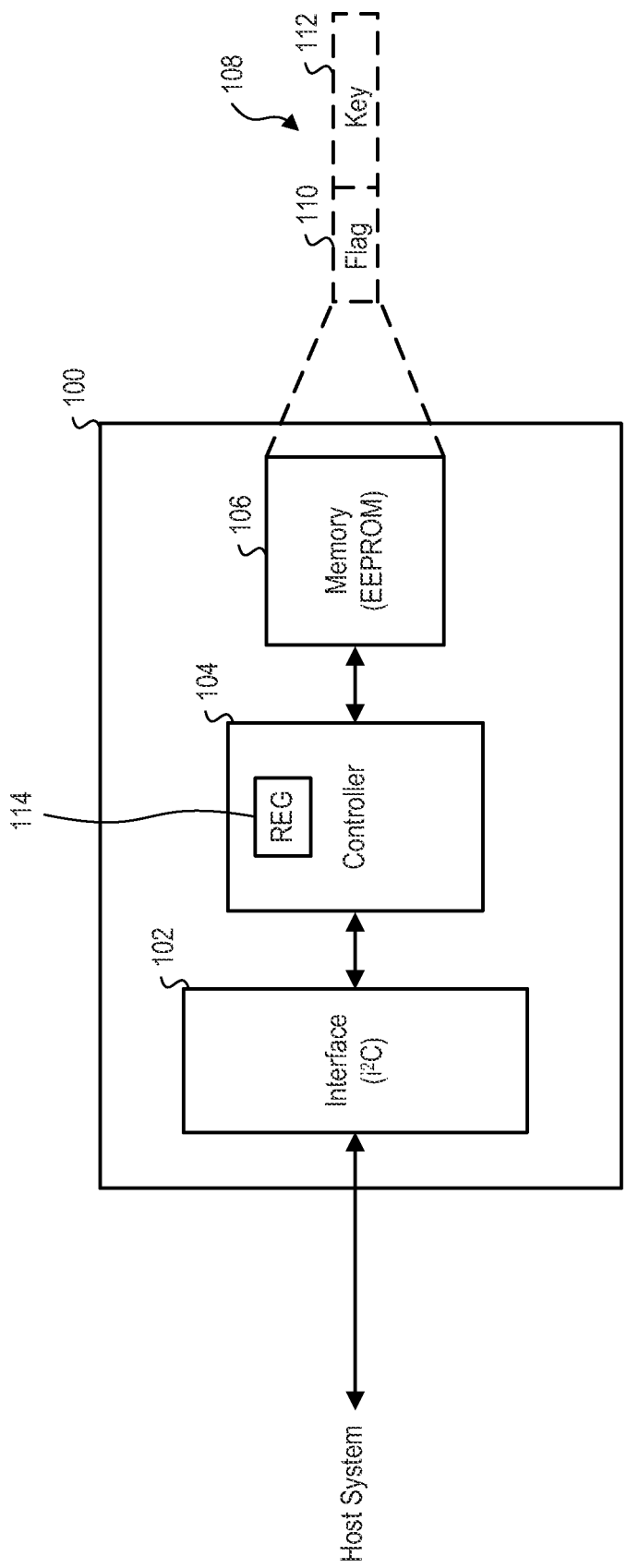
FIG. 1 illustrates an example authentication device for storing key authorization status.

FIG. 1 illustrates an example hardware authentication device 100 for storing key authorization status. Device 100 may be an integrated circuit (IC) chip. Device 100 may be included in a data processing device, such as a personal computer, smartphone, electronic tablet or any other device that requires or performs authentication. In the configuration shown, device 100 includes interface 102, controller 104 and memory 106. Interface 102 may be a standard two-wire interface (e.g., a I²C interface) or single wire interface for communication with host systems. Controller 104 may be a microcontroller or any kind of sequencer based on logic (e.g., digital logic). Memory 106 may be Electrically Erasable Programmable Read-Only Memory (EEPROM) or any other suitable memory (e.g., SRAM).

Controller 104 can execute commands received on interface 102 and perform cryptographic algorithms in response to the commands, including but not limited to hash algorithms (e.g., SHA-256) and public key encryption algorithms (e.g., ECDSA). Some examples of applications for authentication device 100 include but are not limited to anti-clone for accessories, daughter cards and consumables, secure boot validation, software anti-piracy, network and computer access control, password handling, and authenticated/encrypted network communications Memory 106 can be used to store keys (e.g., public and private keys), miscellaneous read/write, read-only or secret data, consumption logging and security configuration. Access to various sections of memory 106 can be restricted in a variety of ways and then the configuration locked to prevent changes. In some implementations, memory 106 may have slot 108 including a number of bytes of memory 106. A first portion 110 of slot 108 may include one or more bits for storing a flag and a second portion 112 of slot 108 may include one or more bytes for storing a key associated with the flag (e.g., a public key). The key may be stored at any desired location on device 100 or generated on-the-fly from a private key if also stored on device 100. The flag and the key may be stored in device 100 as a secure package to preserve their relation to each other and to protect both the flag and the key from attacks.

In some implementations, the flag indicates an authorization state for the key. Slot 108 may be set in response to one or more internal commands or commands received over interface 102 during an authentication session. The flag may be a single bit that indicates an authorization state for the key. For example, if the flag is set (e.g., set to 1), then the authorization state for the key is valid and the key may be used in a cryptographic operation without reauthorizing the key. By avoiding reauthorizing the key for each cryptographic operation using the key (e.g., repeating cryptographic operations on the same key), the authentication session may be completed more quickly. In some implementations, the key may be a public key, and the authorization sequence may include verifying that the signature is correctly generated from a given message and the public key using an ECDSA signature verification algorithm (e.g., FIPS 186-3). The public key may be stored in memory 106 or other secure memory, such as portion 112 of slot 108 of memory 106.

In some implementations, the flag and key may be stored in a hardware register in device 100 in response to a command received over interface 102. This allows the flag and key to be read by the host system. For example, a flag and key may be stored in hardware register 114 in controller 104, where it may be read out by a host system through interface 102. In some implementations, register 114 may be cleared at the time a new authorization is being performed with the same or different key. In another or the same implementation, register 114 may be cleared each time register 114 is read. Clearing register 114 each time register 114 is read enables a single use strategy for improved security.

In some implementations, writing to register 114 resets a counter. Each time register 114 is read the counter is incremented or decremented (e.g., incremented or decremented by 1). The flag would indicate that the authorization sequence is invalid if the counter reaches a certain predetermined value. In another or the same implementation, writing to register 114 resets a timer. Each time register 114 is read the timer starts. The flag would indicate that the authorization sequence is invalid if a timer value expires. The timer and counter may be implemented in software by controller 102 and/or implemented in hardware.

Example Key Authorization Process

Figure 2:
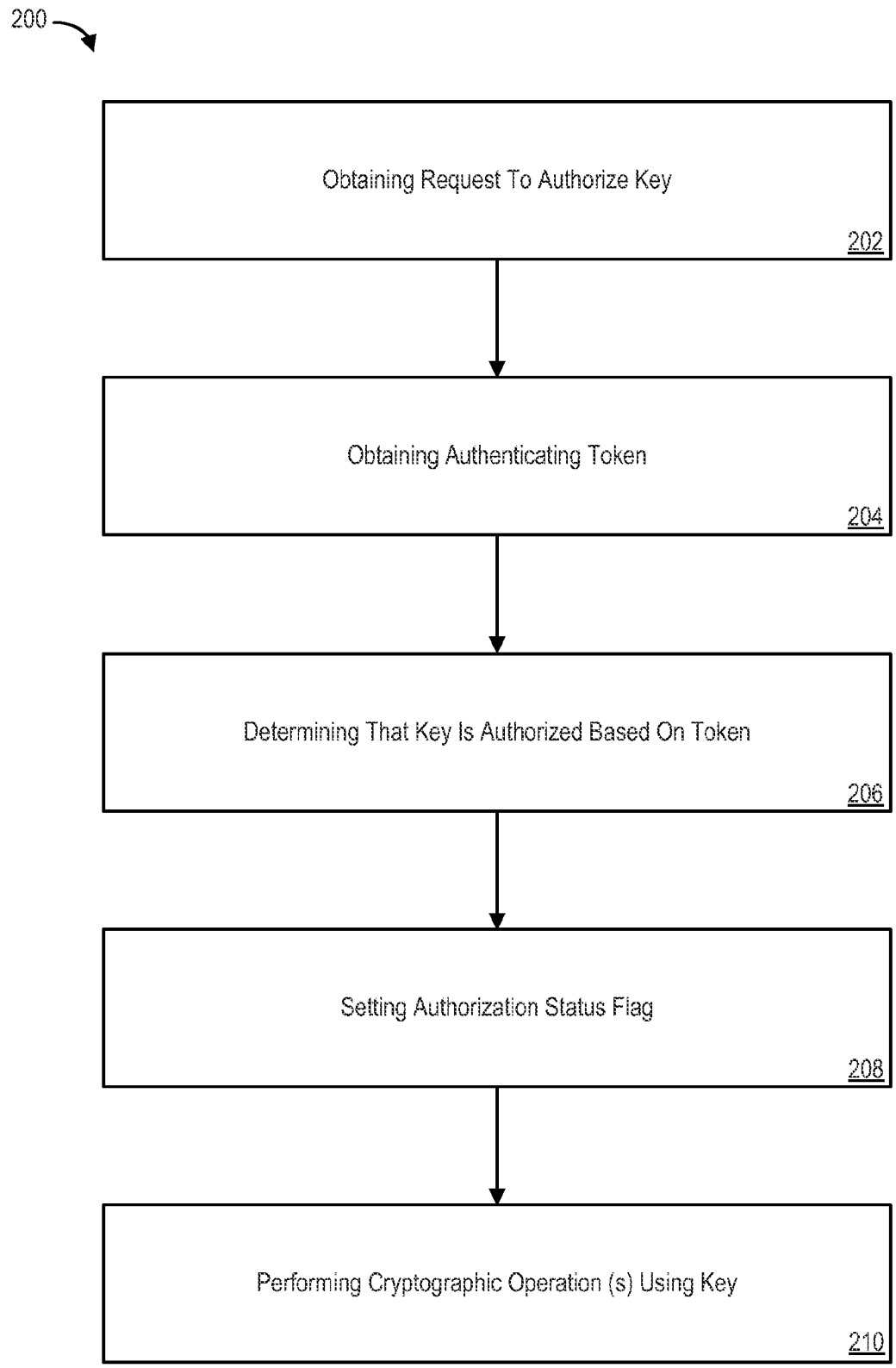
FIG. 2 is a flow diagram illustrating an example process for setting key authorization status.

FIG. 2 is a flow diagram illustrating an example process 200 for setting key authorization status. Process 200 may be implemented by controller 102 in authentication device 100, as described in reference to FIG. 1.

In some implementations, process 200 may begin by obtaining a request to authorize a key (202). The request may be in the form of a command received from a host system over a bus or from an internally generated command.

Process 200 may continue by obtaining an authenticating token (204). The token may be an n-bit number stored in secure memory (e.g., 128 or 256 bits). An example token may be a digest of a password. The token may be in obtained from a removable storage device that a user may retrieve when the user needs to use a key (e.g., a public key) that requires authentication. The token may be stored in non-volatile memory (e.g., Flash, hard disk) within an authentication device, which has authority to use the key, or could be transmitted to an authentication device by a third party at the time in which authorization is required and therefore not stored by the authentication device at all.

Process 200 may continue by determining that the key is authorized based on the token (206), and setting an authorization status flag (208). The flag may be stored in memory or in a hardware register for multiple uses or later use at the same or different location. If a cryptographic operation needs to use the key, the flag may be read to determine if the key is authorized. If the key is authorized as indicated by the flag value, the cryptographic operation may be performed using the authorized key without reauthorizing the key.

Process 200 may continue by performing one or more cryptographic operations using the authorized key (210). A cryptographic operation may be any operation that a cryptographic algorithm would perform using an authorized key (e.g., ECDSA operation).

Figure 3:
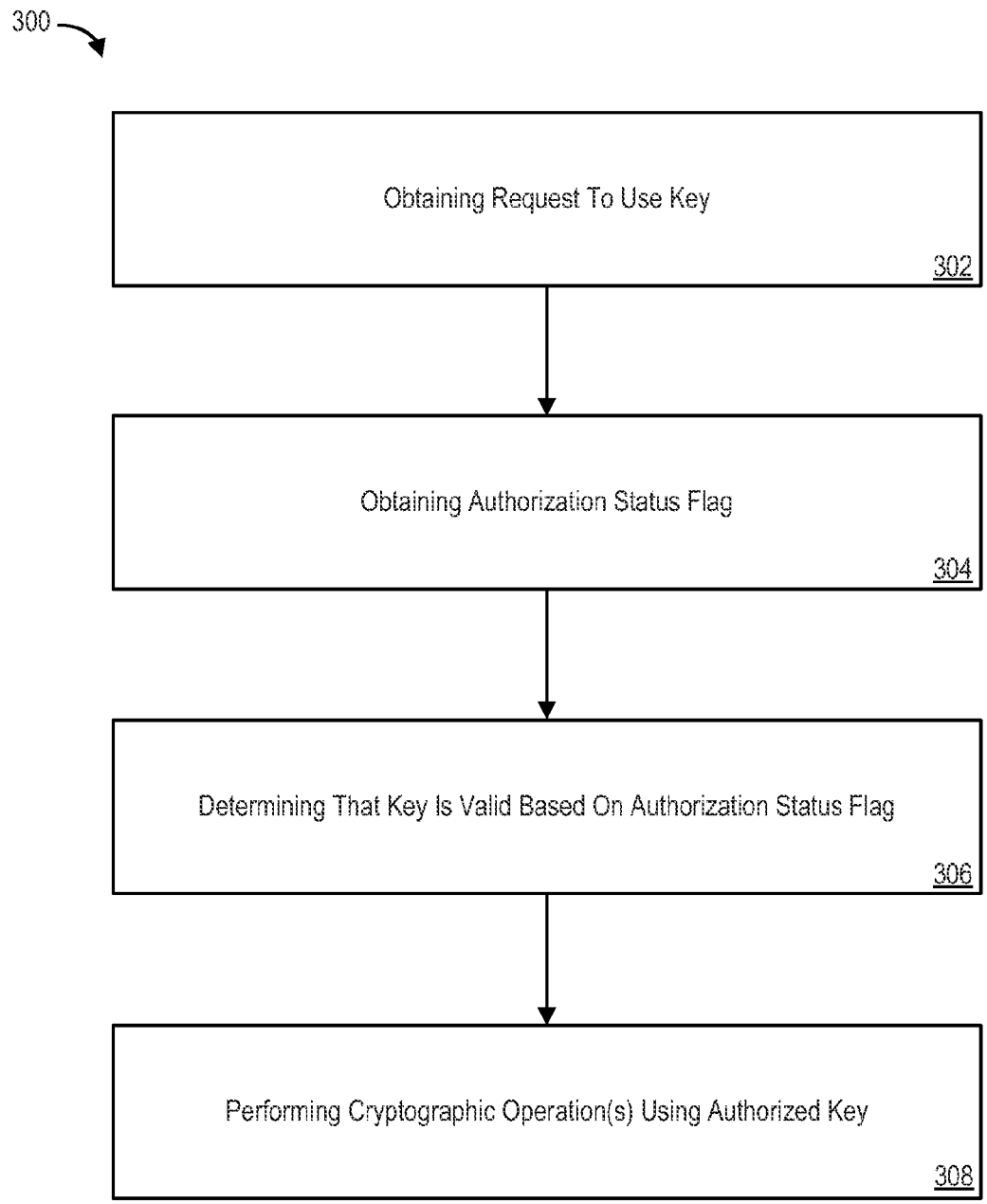
FIG. 3 is a flow diagram illustrating an example process for obtaining key authorization status.

FIG. 3 is a flow diagram illustrating an example process 300 for obtaining key authorization status. Process 300 may be implemented by controller 102 in authentication device 100, as described in reference to FIG. 1.

In some implementations, process 300 may begin by obtaining a request to use a key (302). Process 300 may continue by obtaining an authorization status flag to determine if the key is authorized (304). The status flag may be read from memory or a hardware register.

Process 300 may continue by determining that the key is valid based on the status flag (306). The status flag may be an n-bit integer (e.g., 1-bit), which if set (e.g., set to 1) indicates that the key is authorized.

Process 300 may continue by performing one or more cryptographic operations using the authorized key (308). If the status flag indicates that the key is not authorized, the key may be reauthorized depending on system policy. Depending on system policy, the authorization mechanism might be a static stored token that authorizes key use or an authorization process that is regenerated using a random (e.g., unique) number.

In some implementations, device 100 implements hierarchy or chaining that has two or more levels. For example, a status flag may be stored for a parent key of a second or child key. When an authentication token is presented to the authentication device 100, the authorized parent key may be used to compute a function to set (or not, depending on the computation result) a status flag for the second or child key.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method comprising:
   obtaining a request, by an authentication device, to authorize a child key of a parent key for use in a cryptographic operation performed by the authentication device;
   obtaining a token for authenticating the parent key;
   determining that the parent key is authorized based on the token;
   in response to determining that the parent key is authorized based on the token, setting a first authorization status flag for the parent key to indicate that the parent key is authorized;
   computing a function using the authorized parent key;
   setting a second authorization status flag for the child key based on a result of the computing;
   determining that the child key is authorized based on the second authorization status flag; and in response to determining that the child key is authorized based on the second authorization status flag, performing one or more cryptographic operations using the authorized child key.

2. The method of claim 1, further comprising:
incrementing or decrementing a counter each time the first or second authorization status flag or authorized parent or child key is accessed or used;
determining that the counter has reached a specified value; and
setting the first or second authorization status flag to indicate that the corresponding parent or child key is not authorized.

3. The method of claim 1, further comprising:
starting a timer each time the first or second authorization status flag or authorized parent or child key is accessed or used;
determining that the timer has reached a specified value; and
setting the first or second authorization status flag to indicate that the corresponding parent or child key is not authorized.

4. The method of claim 1, where the one or more cryptographic operations include a digital signature verification operation.

5. The method of claim 1, where the authentication device is an integrated circuit chip, and
wherein the first authorization status flag and the parent key are stored together as a first secure package in a first memory portion of the authentication device, and the second authorization status flag and the child key are stored together as a second secure package in a second, different memory portion of the authentication device.

6. A method comprising:
obtaining a request, by an authentication device, to use a child key of a parent key in a cryptographic operation performed by the authentication device, where the parent key is authorized if a first authorization status flag indicates that the parent key is authorized, the first authorization status flag being set in response to determining that the parent key is authorized based on a token associated with the parent key and the child key is authorized if a second authorization status flag indicates that the child key is authorized, the second authorization status flag being set as a result of a computation of a function using the authorized parent key;
obtaining the second authorization status flag;
determining that the child key is authorized based on the second authorization status flag; and
in response to determining that the child key is authorized based on the second authorization status flag, performing one or more cryptographic operations using the authorized child key.

7. The method of claim 6, further comprising:
determining that the parent or child key is not authorized based on the corresponding first or second authorization status flag;
reauthorizing the parent and child key; and
performing the cryptographic operation using the reauthorized parent and child key.

8. A device, comprising:
a controller configured to execute commands, which when executed by the controller, causes the controller to perform operations comprising:
obtaining a request to authorize a parent key of a child key for use in a cryptographic operation;
obtaining a token for authenticating the parent key;
determining that the parent key is authorized based on the token;
in response to determining that the parent key is authorized based on the token, setting a first authorization status flag to indicate that the parent key is authorized;
computing a function using the authorized parent key;
setting a second authorization status flag for the child key based on a result of the computing;
determining that the child key is authorized based on the second authorization status flag; and
in response to determining that the child key is authorized based on the second authorization status flag, performing one or more cryptographic operations using the authorized child key.

9. The device of claim 8, further comprising:
incrementing or decrementing a counter each time the first or second authorization status flag or authorized parent or child key is accessed or used;
determining that the counter has reached a specified value; and
setting the first or second authorization status flag to indicate that the corresponding parent or child key is not authorized.

10. The device of claim 8, further comprising:
starting a timer each time the first or second authorization status flag or authorized parent or child key is accessed or used;
determining that the timer has reached a specified value; and
setting the first or second authorization status flag to indicate that the corresponding parent or child key is not authorized.

11. The device of claim 8, where the one or more cryptographic operations includes a digital signature verification operation.

12. The device of claim 8, where the authentication device is an integrated circuit chip, and
wherein the first authorization status flag and the parent key are stored together as a first secure package in a first memory portion of the authentication device, and the second authorization status flag and the child key are stored together as a second secure package in a second, different memory portion of the authentication device.

13. A device, comprising:
a controller configured to execute commands, which when executed by the controller, causes the controller to perform operations comprising:
obtaining a request, by an authentication device, to use a child key of a parent key in a cryptographic operation performed by the authentication device, where the parent key is authorized if a first authorization status flag indicates that the parent key is authorized, the first authorization status flag being set in response to determining that the parent key is authorized based on a token associated with the parent key, and the child key is authorized if a second authorization status flag indicates that the child key is authorized, the second authorization status flag being set as a result of a computation of a function using the parent key;
obtaining the second authorization status flag;
determining that the child key is authorized based on the second authorization status flag; and
in response to determining that the child key is authorized based on the second authorization status flag, performing one or more cryptographic operations using the authorized child key.

14. The device of claim 13, further comprising:
determining that the parent or child key is not authorized based on the corresponding first or second authorization status flag;
reauthorizing the parent and child key; and
performing the one or more cryptographic operations using the reauthorized parent and child key.

15. The device of claim 14, further comprising:
storing the first or second authorization status flag and the corresponding parent or child key together in a protected location.

16. A method comprising:
obtaining a first request at a first time, by an authentication device, to authorize a parent key of a child key for use in a cryptographic operation performed by the authentication device;
obtaining a token for authenticating the parent key;
determining that the parent key is authorized based on the token;
in response to determining that the parent key is authorized based on the token, setting a first authorization status flag to indicate that the parent key is authorized;
computing a function using the authorized parent key;
setting a second authorization status flag for the child key based on a result of the computing;
determining that the child key is authorized based on the second authorization status flag; and
in response to determining that the child key is authorized based on the second authorization status flag, performing one or more first cryptographic operations using the authorized child key;
obtaining a second request at a second time occurring later than the first time, by the authentication device, to authorize the child key for use in a cryptographic operation performed by the authentication device;
obtaining the second authorization status flag;
determining that the child key is authorized based on the second authorization status flag; and
in response to determining that the child key is authorized based on the second authorization status flag, performing one or more second cryptographic operations using the authorized child key.

17. The method of claim 16, further comprising:
incrementing or decrementing a counter each time the first or second authorization status flag or authorized parent or child key is accessed or used;
determining that the counter has reached a specified value; and
setting the first or second authorization status flag to indicate that the corresponding parent or child key is not authorized.

18. The method of claim 16, further comprising:
starting a timer each time the first or second authorization status flag or authorized parent or child key is accessed or used;
determining that the timer has reached a specified value; and
setting the first or second authorization status flag to indicate that the corresponding parent or child key is not authorized.

19. The method of claim 16, further comprising:
storing the first or second authorization status flag and the corresponding parent or child key together in a protected location.

20. The method of claim 16, further comprising:
determining that the parent or child key is not authorized based on the corresponding first or second authorization status flag;
reauthorizing the parent and child keys; and
performing the one or more cryptographic operations using the reauthorized parent and child keys.

\* \* \* \* \*